United States Patent
Nicholson et al.

(10) Patent No.: US 11,233,923 B2
(45) Date of Patent: Jan. 25, 2022

(54) DISPLAY-COVERED CAMERA

(71) Applicant: Lenovo (Singapore) Pte. Ltd., Singapore (SG)

(72) Inventors: John Weldon Nicholson, Cary, NC (US); Daryl Cromer, Raleigh, NC (US); Howard Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/366,366

(22) Filed: Mar. 27, 2019

(65) Prior Publication Data
US 2020/0314295 A1 Oct. 1, 2020

(51) Int. Cl.
| | |
|---|---|
| *H04N 5/225* | (2006.01) |
| *G06F 3/042* | (2006.01) |
| *G06F 3/0488* | (2013.01) |
| *H04N 5/232* | (2006.01) |
| *G06F 3/01* | (2006.01) |
| *G09G 3/3216* | (2016.01) |
| *H04N 5/235* | (2006.01) |
| *H04M 1/02* | (2006.01) |

(52) U.S. Cl.
CPC ........... *H04N 5/2251* (2013.01); *G06F 3/013* (2013.01); *G06F 3/0425* (2013.01); *G06F 3/04883* (2013.01); *G09G 3/3216* (2013.01); *H04N 5/2354* (2013.01); *H04N 5/23216* (2013.01); *H04N 5/23219* (2013.01); *G09G 2360/10* (2013.01); *H04M 1/0264* (2013.01); *H04M 1/0266* (2013.01)

(58) Field of Classification Search
CPC ............. H04N 5/2251; H04N 5/23216; H04N 5/23219; H04N 5/2354; G06F 3/013; G06F 3/0425; G06F 3/04883; G09G 3/3216; G09G 2360/10; H04M 1/0264; H04M 1/0266
See application file for complete search history.

(56) References Cited

U.S. PATENT DOCUMENTS

| | | | | |
|---|---|---|---|---|
| 7,808,540 | B2 * | 10/2010 | Cok | H04N 7/144 348/333.01 |
| 9,754,526 | B2 * | 9/2017 | Evans, V | G09G 3/36 |
| 9,843,736 | B2 * | 12/2017 | Evans, V | H04N 5/247 |
| 2009/0009628 | A1 * | 1/2009 | Janicek | H04N 5/232 348/231.99 |
| 2011/0279689 | A1 * | 11/2011 | Maglaque | H04N 5/2253 348/207.1 |
| 2013/0182062 | A1 * | 7/2013 | Son | H04N 7/144 348/14.07 |
| 2014/0189583 | A1 * | 7/2014 | Yang | G06F 1/3265 715/800 |
| 2016/0349985 | A1 * | 12/2016 | Ibaraki | G06F 3/04845 |

* cited by examiner

*Primary Examiner* — Luong T Nguyen
(74) *Attorney, Agent, or Firm* — Ference & Associates LLC

(57) ABSTRACT

One embodiment provides a method, comprising: receiving, at an information handling device, an indication to activate a camera positioned underneath a display portion of the information handling device; identifying, using a processor, a location of at least one pixel on the display portion positioned overtop the camera; disabling, based on the identifying, the at least one pixel; performing, subsequent to the disabling and using the camera, a function; and enabling, responsive to identifying that the function was performed, the at least one pixel. Other aspects are described and claimed.

18 Claims, 3 Drawing Sheets

DISPLAY-COVERED CAMERA

BACKGROUND

Modern information handling devices ("devices"), for example smart phones, tablets, laptop and personal computers, other electronic devices, and the like, comprise a front-facing camera integrated into the device that is capable of capturing images, videos, etc. Conventionally, most front-facing cameras were integrated into a top portion of the bezel that surrounds a display screen of the device. Advances in technology have led to near bezel-less displays, where the display screen occupies nearly the entire front area of the device. Accordingly, in these situations, many bezel-less, or near bezel-less, devices integrate the front-facing camera into a notch that protrudes down from the top of the device into an upper portion of the display screen area.

BRIEF SUMMARY

In summary, one aspect provides a method, comprising: receiving, at an information handling device, an indication to activate a camera positioned underneath a display portion of the information handling device; identifying, using a processor, a location of at least one pixel on the display portion positioned overtop the camera; disabling, based on the identifying, the at least one pixel; performing, subsequent to the disabling and using the camera, a function; and enabling, responsive to identifying that the function was performed, the at least one pixel.

Another aspect provides an information handling device, comprising: a display portion; a camera positioned underneath the display portion; a processor; a memory device that stores instructions executable by the processor to: receive an indication to active the camera; identify a location of at least one pixel on the display portion positioned overtop the camera; disable, based on the identifying, the at least one pixel; perform, subsequent to the disabling and using the camera, a function; and enable, responsive to identifying that the function was performed, the at least one pixel.

A further aspect provides a product, comprising: a storage device that stores code, the code being executable by a processor and comprising: code that receives an indication to activate a camera positioned underneath a display portion of an information handling device; code that identifies a location of at least one pixel on the display portion positioned overtop the camera; code that disables, based on the identifying, the at least one pixel; code that performs, subsequent to the disabling and using the camera, a function; and code that enables, responsive to identifying that the function was performed, the at least one pixel.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
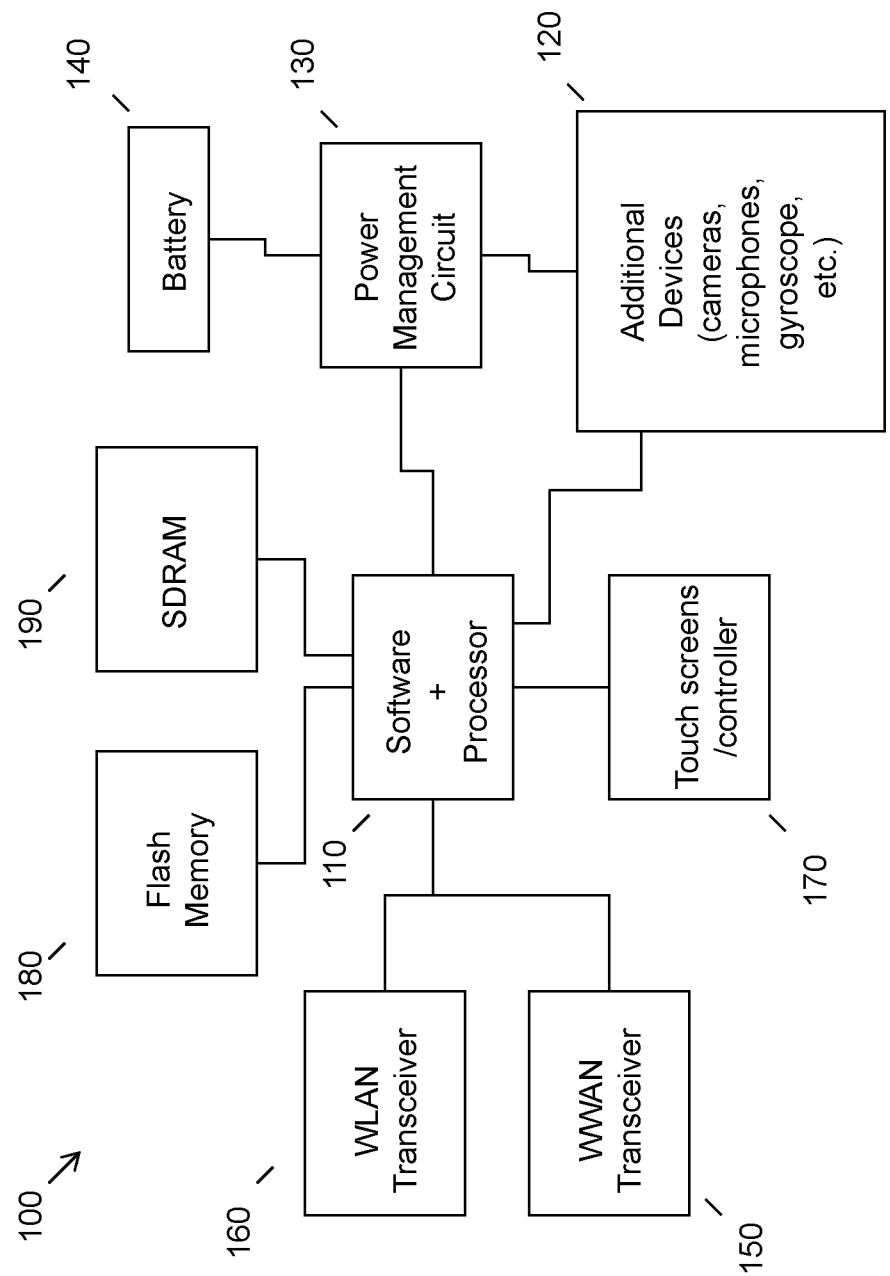
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Many devices, smart phones in particular, are moving toward a bezel-less display. Such a design may not only be aesthetically pleasing to a user but may also allow applications to leverage their utility across a greater surface area. Another advantage may be that a user may be provided with a larger screen in a smaller package. However, the current trend of integrating the front-facing camera ("camera") into a notch (i.e., an area that extends down from the top of the device into a portion of the display area) prevents a full bezel-less display from being achieved.

One potential method of removing the notch is to situate the camera underneath the display area. This configuration may allow the display area to be fully extended up to the top of the device, thereby allowing the display area to occupy all, or nearly all, of the front region of the device. However, one issue with this solution is that the light capturing abilities of the camera are degraded by the pixels situated in front it. Additionally, if the pixels are white/emitting, i.e., for organic light-emitting diode (OLED) displays, the degradation may be 100% because each pixel in an OLED display provides its own illumination.

Accordingly, an embodiment provides a method for disabling one or more pixels positioned in front of a display-covered camera during image/video capture. In an embodiment, an indication may be received at the device to activate a camera (e.g., a front-facing camera, etc.). The camera may be positioned underneath one or more pixels of a display area of the device. An embodiment may identify a location of the pixels positioned above the camera and thereafter disable (i.e., turn off) those pixels. Subsequent to disabling the pixels, an embodiment may perform a function using the camera (e.g., capture an image, a video, perform another function, etc.). Responsive to identifying that the function is performed, an embodiment may thereafter enable the disabled pixels. Such a method may allow a device to achieve a substantially bezel-less design while also preserving the functionality of the camera.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
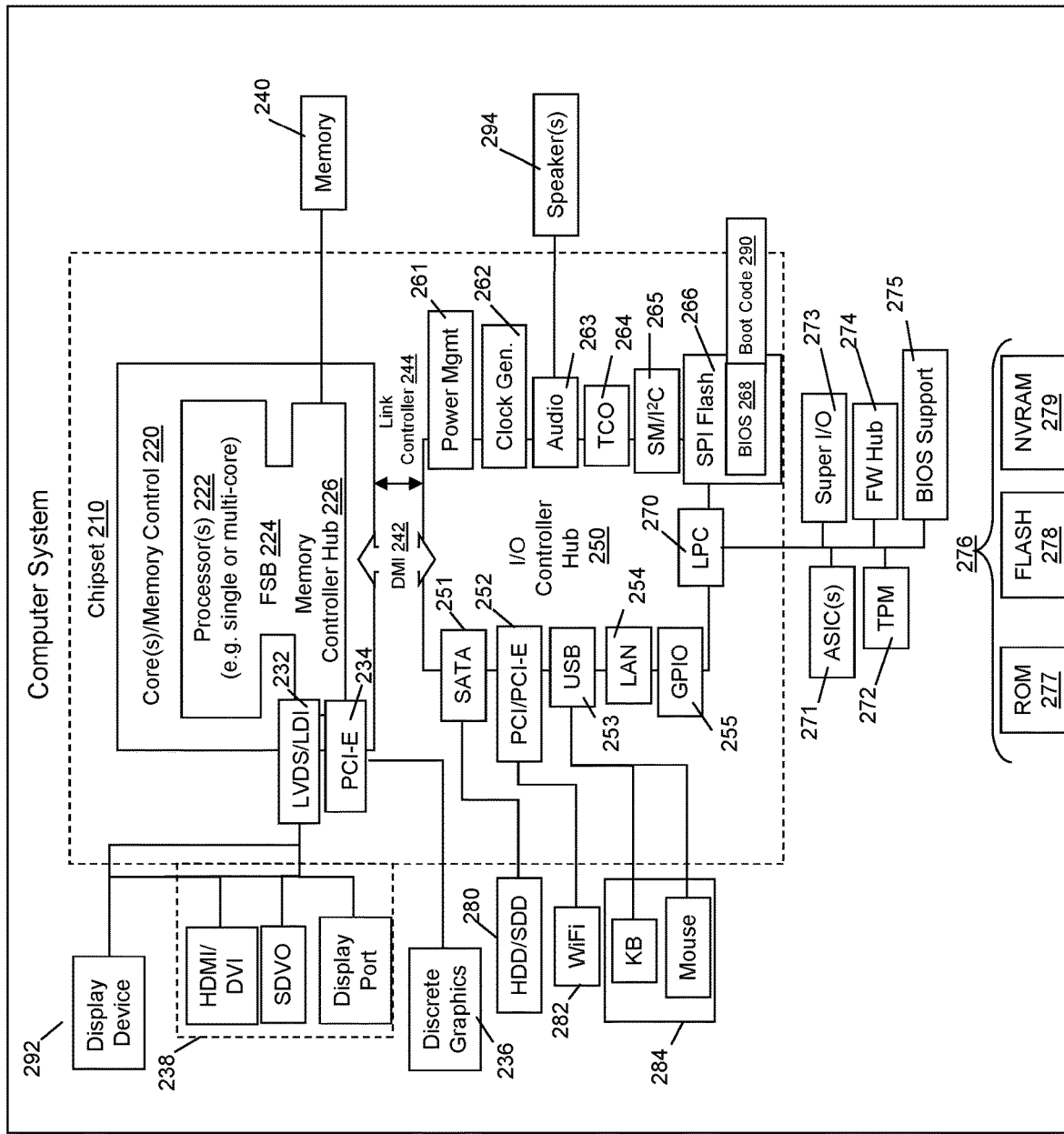
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart displays, laptops, and/or electronic devices that may support one or more integrated cameras (e.g., a worldview camera, a front-facing camera, etc.). For example, the circuitry outlined in FIG. 1 may be implemented in a tablet or smart phone embodiment, whereas the circuitry outlined in FIG. 2 may be implemented in a laptop.

Figure 3:
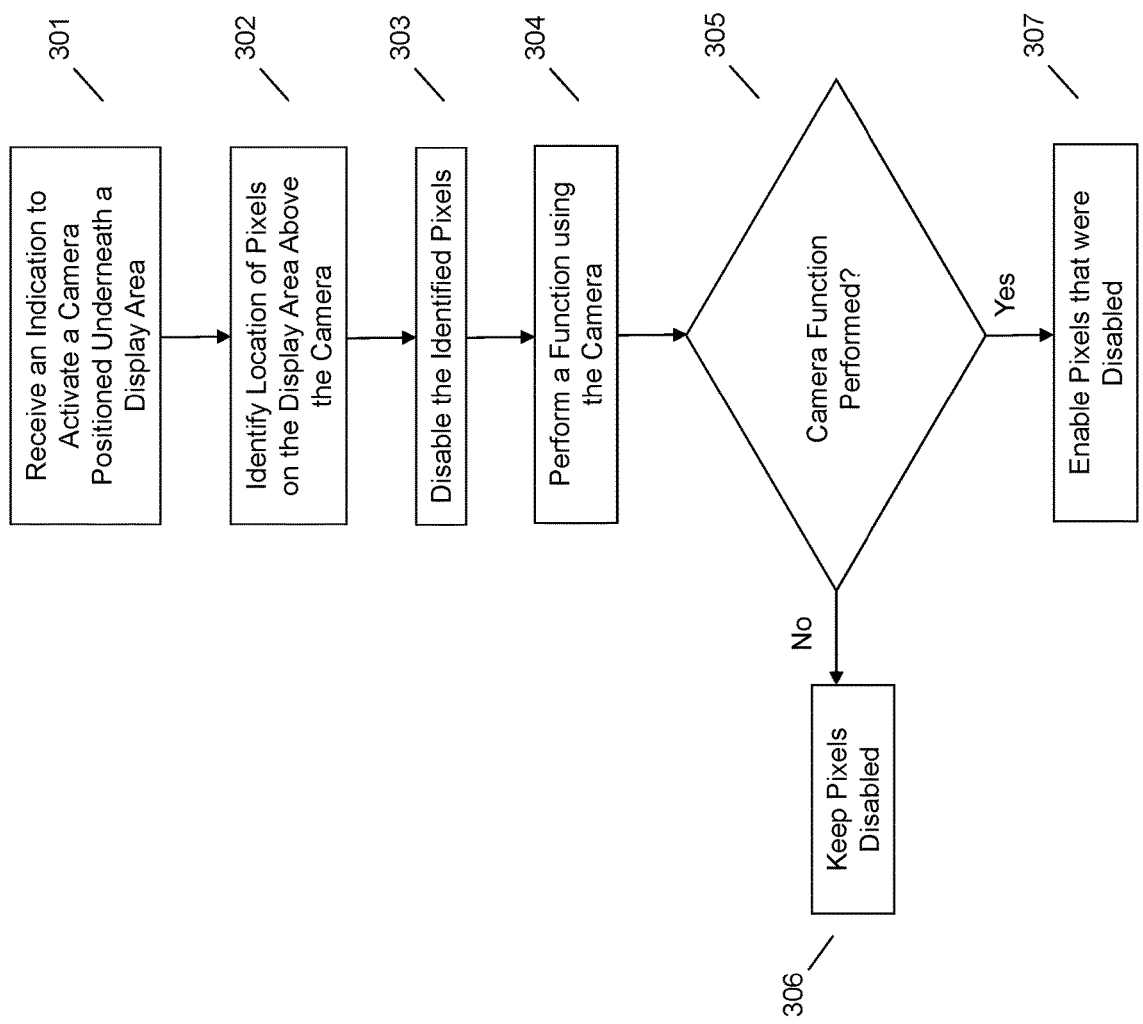
FIG. 3 illustrates an example method of performing functions with a camera situated underneath a display of an information handling device.

Referring now to FIG. 3, an embodiment may deactivate one or more pixels of a display located in front of a display-covered camera when an indication to activate the camera is received. At 301, an embodiment may receive an indication to activate a camera. In an embodiment, the camera may be a front-facing camera that may be positioned underneath a portion of a display area (e.g., a touch-sensitive display area, etc.) on a front surface of the device. In an embodiment, the display area may be an edge-to-edge display area. More particularly, in an embodiment, the edge-to-edge display area may constitute substantially the entire front surface of the device, effectively eliminating the bezel.

In an embodiment, the indication may be derived from a user-command to activate the camera. In one non-limiting example, a user may provide touch input to a camera application icon displayed on the display screen. As another non-limiting example, a user may provide a voice command (e.g., to an audio capture device operatively coupled to the device, etc.) to activate the camera. Alternatively, an embodiment may derive this indication dynamically from context analysis. For example, an embodiment may automatically activate a camera responsive to detecting that a user is within a predetermined threshold distance from the device (e.g., using one or more proximity sensors, using data gathered by other devices and transmitted to the device, etc.). In another non-limiting example, an embodiment may automatically activate a camera responsive to detecting that the device is in a camera-activating orientation (e.g., a user has raised their device from a horizontal position to a vertical position, etc.).

At 302, an embodiment may identify a location and/or numbers of pixels on the display portion that are situated overtop the camera. In an embodiment, the foregoing pixel data may be specific to each device, or each device type, and may be programmed and stored in a database. More particularly, the database may comprise information associated with the size and location of the camera for each device as well as identifying information regarding the pixels situated above the camera. An embodiment may thereafter be able to refer to this database to identify which pixels are located above the camera. For example, a camera sensor of a device may comprise an approximate 4 mm radius. For a screen density of 500 ppi (20 ppmm$^2$), the 4 mm radius may correspond to an area on the display surface comprising about 1000 pixels. The identity and/or location of these 1000 pixels may be identified and thereafter stored in the database. In an embodiment, the database may be stored locally, on the device, or may be stored at a remote storage location (e.g., on another device or server, etc.) and accessible by the device via a wired or wireless connection.

At 303, an embodiment may disable the pixels identified as being on the display area positioned on top of the camera. In the context of this application, disabled pixels may refer to pixels that have become transparent (e.g., pixels that do not emit any light or pixels which are not being illuminated by any light, etc.). In an embodiment, the process for making the crystals transparent may be dependent on the type of display screen positioned over the camera. For example, in the case of a light-emitting diode (LED) display screen, disabling a pixel may refer to the deactivation of the particular light-emitting diodes that may illuminate the pixels positioned above the camera. As another example, in the case of an organic light-emitting diode (OLED) display screen, disabling a pixel may refer to the severance of an electrical current to the particular pixels positioned above the camera. In both of the aforementioned examples, other pixels on the display may remain enabled while the pixels located above the camera are disabled. More particularly, an illumination source or an electrical current may be actuated on or against all other pixels while an illumination source or an electrical current is not actuated on or against the pixels above the camera.

In an embodiment, the pixels may be disabled for the duration of time that the camera is activated. In an embodiment, the camera may be considered activated when it is actively in use (e.g., while the camera is capturing images, recording video, performing another function, etc.), when an application that utilizes the camera is in use, etc. Responsive to identifying that the camera is no longer active, the pixels may be reactivated. For example, the pixels may be deactivated while a front-facing setting in a camera application is active and thereafter reactivated responsive to detecting that the camera application is no longer active or that the front-facing setting on the camera application is no longer active.

In an embodiment, responsive to receiving the indication to activate a camera, an embodiment may initiate a one-handed mode setting. In an embodiment, the one-handed mode setting may adjust the dimensional characteristics and/or layout of an active display area so that a user may more easily interact with applications in the display area by utilizing only one hand. For example, an embodiment may decrease the size of the display area to 75% of its normal size and move the reduced display area toward a bottom portion of the device. This may allow a user to more easily interact with an application by using their thumb and also ensure that the reduced display area is not in the camera area. Furthermore, in an embodiment, some or all pixels outside of the reduced display area may be deactivated. In this situation, all portions of the display area outside of the reduced display may appear black. The deactivation of pixels in these other areas may lessen the visual impact of just deactivating the pixels situated on top of the camera. In an embodiment, the one-handed mode may be automatically activated without the receipt of additional user input. For example, the one-handed mode may automatically activate when the indication to activate the camera is received. Alternatively, an embodiment may query the user (e.g., by an audio or visual notification query, etc.) whether they want to enter one-handed mode while the camera is active. Responsive to receiving confirmation input from the user, an embodiment may initiate one-handed mode. In an embodiment, the one-handed mode may be automatically deactivated responsive to identifying that the camera is no longer activated. In this sense, an embodiment may reactivate any and all pixels that were deactivated outside the border of the reduced display area.

In an embodiment, a plurality of other pixels, not directly above the camera, may also be disabled to form a predetermined pattern. A motivation for this may be to reduce the potential aesthetic disturbance the disabling of a plurality of pixels on an edge to edge display may cause. Accordingly, an embodiment may disable certain other pixels surrounding the pixels positioned above the camera in order to form a predetermined shape or device feature. For example, an embodiment may disable the pixels directly above and around the camera in order to form a shape such as a circle, rectangle, star, etc. As another example, a plurality of other pixels located at the top of the display area may be deactivated to form the appearance of a conventional notch. Other shapes, patterns, and designs not explicitly mentioned here may also be utilized as long as the shape, pattern or design covers all of pixels overtop of the camera. In an embodiment, the shape or device feature formed by the deactivation of the other pixels may be originally set by a manufacturer and thereafter adjusted by a user.

In an embodiment, the deactivation of pixels of the pixels above the camera may cause applications to adjust one of more of their characteristics (e.g., location, behavior, etc.). For example, responsive to receiving an indication to activate a camera, the OS/framework may report that there is a notch and applications should behave accordingly (e.g., applications should not display content on a portion occupied by the simulated notch, applications should adjust a top border of the application window to terminate below a bottom edge of the simulated notch, etc.). In an embodiment, when the camera is deactivated, applications may automatically resume their normal functionality.

Responsive to disabling, at 303, the pixels above the camera, an embodiment may, at 304, perform a function using the camera. In an embodiment, the function may be virtually any function for which a camera must be utilized (e.g., an image capture function, a video capture function, a facial recognition function, a gaze tracking function, etc.). Responsive to identifying, at 305, that the function was performed with the camera, an embodiment may, at 307, enable the pixels that were disabled. Conversely, responsive to identifying, at 305, that the function has not yet been performed by the camera, an embodiment may, at 306, keep the pixels disabled.

The various embodiments described herein thus represent a technical improvement to conventional camera utilization techniques. Using the techniques described herein, an embodiment may allow for a substantially bezel-less display area while simultaneously preserving the functionality of a front-facing camera. In an embodiment, the camera may be positioned at a location underneath the display area. More particularly, the pixels of the display area may be positioned overtop a light capturing lens of the camera. Responsive to receiving an indication to activate the camera, an embodiment may disable those pixels identified as being positioned over the lens of the camera, thereby allowing the camera to capture a sufficient amount of light and image data. Once the pixels are disabled, an embodiment may utilize the camera to perform one or more functions. Such a method may preserve the functionality of a camera positioned beneath a display area and also may prevent the degradation of camera image quality when the camera is in use.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, at an information handling device, an indication to activate a camera positioned underneath a display portion of the information handing device;
    identifying, using a processor, a location of at least one pixel on the display portion positioned overtop the camera;
    disabling, based on the identifying, the at least one pixel;
    automatically adjusting, based on the indication and in response to the disabling and without receiving additional user input, at least one dimensional characteristic of a content display area on the display portion, wherein the automatically adjusting comprises:
    decreasing a size of the content display area from an original size to a reduced size;
    relocating the content display area at the reduced size to another location on the display portion that does not overlap with the location of the at least one pixel; and
    deactivating all other pixels, in addition to the at least one pixel, located outside the content display area;
    performing, subsequent to the disabling and using the camera, a function;

enabling, responsive to identifying that the function was performed, the at least one pixel and the all other pixels; and automatically reforming, subsequent to the enabling, the content display area to the original size.

2. The method of claim 1, wherein the indication is associated with at least one of a user-command and a context determination.

3. The method of claim 1, wherein the display portion is an edge-to-edge display portion.

4. The method of claim 1, wherein the display portion is a touch-sensitive display portion.

5. The method of claim 1, wherein the at least one pixel comprises a plurality of pixels.

6. The method of claim 5, wherein the disabling the plurality of pixels comprises disabling the plurality of pixels in a predetermined pattern.

7. The method of claim 1, further comprising adjusting, based on the disabling, a characteristic of an active application.

8. The method of claim 7, wherein the characteristic comprises at least one of an application position and an application behavior.

9. The method of claim 1, wherein the function is at least one function selected from the group consisting of: an image capture function, a video capture function, a facial recognition function, and a gaze tracking function.

10. An information handling device, comprising:
a display portion of the information handling device;
a camera positioned underneath the display portion;
a processor;
a memory device that stores instructions executable by the processor to:
receive an indication to active the camera;
identify a location of at least one pixel on the display portion positioned overtop the camera;
disable, based on the identifying, the at least one pixel;
automatically adjust, based on the indication and in response to the disabling and without receiving additional user input, at least one dimensional characteristic of a content display area on the display portion, wherein the instructions executable by the processor to automatically adjust comprise instructions executable by the processor to:
decrease a size of the content display area from an original size to a reduced size;
relocate the content display area at the reduced size to another location on the display portion that does not overlap with the location of the at least one pixel; and
deactivate all other pixels, in addition to the at least one pixel, located outside the content display area:
perform, subsequent to the disabling and using the camera, a function;
enable, responsive to identifying that the function was performed, the at least one pixel and the all other pixels; and
automatically reform, subsequent to the enabling, the content display area to the original size.

11. The information handling device of claim 10, wherein the indication is associated with at least one of a user-command and a context determination.

12. The information handling device of claim 10, wherein the display portion is an edge-to-edge display portion.

13. The information handling device of claim 10, wherein the at least one pixel comprises a plurality of pixels.

14. The information handling device of claim 13, wherein the instructions executable by the processor to disable the plurality of pixels comprise instructions executable by the processor to disable the plurality of pixels in a predetermined pattern.

15. The information handling device of claim 10, wherein the instructions are further executable by the processor to adjust, based on the disabling, a characteristic of an active application.

16. The information handling device of claim 10, wherein the characteristic comprises at least one of an application position and an application behavior.

17. The information handling device of claim 10, wherein the function is at least one function selected from the group consisting of: an image capture function, a video capture function, a facial recognition function, and a gaze tracking function.

18. A product, comprising:
a non-transitory storage device that stores code, the code being executable by a processor and comprising:
code that receives an indication to activate a camera positioned underneath a display portion of an information handling device;
code that identifies a location of at least one pixel on the display portion positioned overtop the camera;
code that disables, based on the identifying, the at least one pixel;
code that automatically adjusts, based on the indication and in response to the code that disables and without receiving additional user input, at least one dimensional characteristic of a content display area on the display portion, wherein the code that automatically adjusts comprises code that:
decreases a size of the content display area at the reduced size;
relocates the content display area at the reduced size to another location on the display portion that does not overlap with the location of the at least one pixel;
code that deactivates all other pixels, in addition to the at least one pixel, located outside the content display area:
code that performs, subsequent to the disabling and using the camera, a function;
code that enables, responsive to identifying that the function as performed, the at least one pixel and the all other pixels; and
code that automatically reforms, subsequent to the enabling, the content display area to the original size.

* * * * *